Oct. 11, 1966
C. V. JOHNSON ETAL
3,277,578
SCREW THREAD GAGE FOR TESTING FOR PITCH DIAMETER, LEAD,
DRUNKENNESS, STRAIGHTNESS, ROUNDNESS AND TAPER
Filed Sept. 6, 1963
4 Sheets-Sheet 1
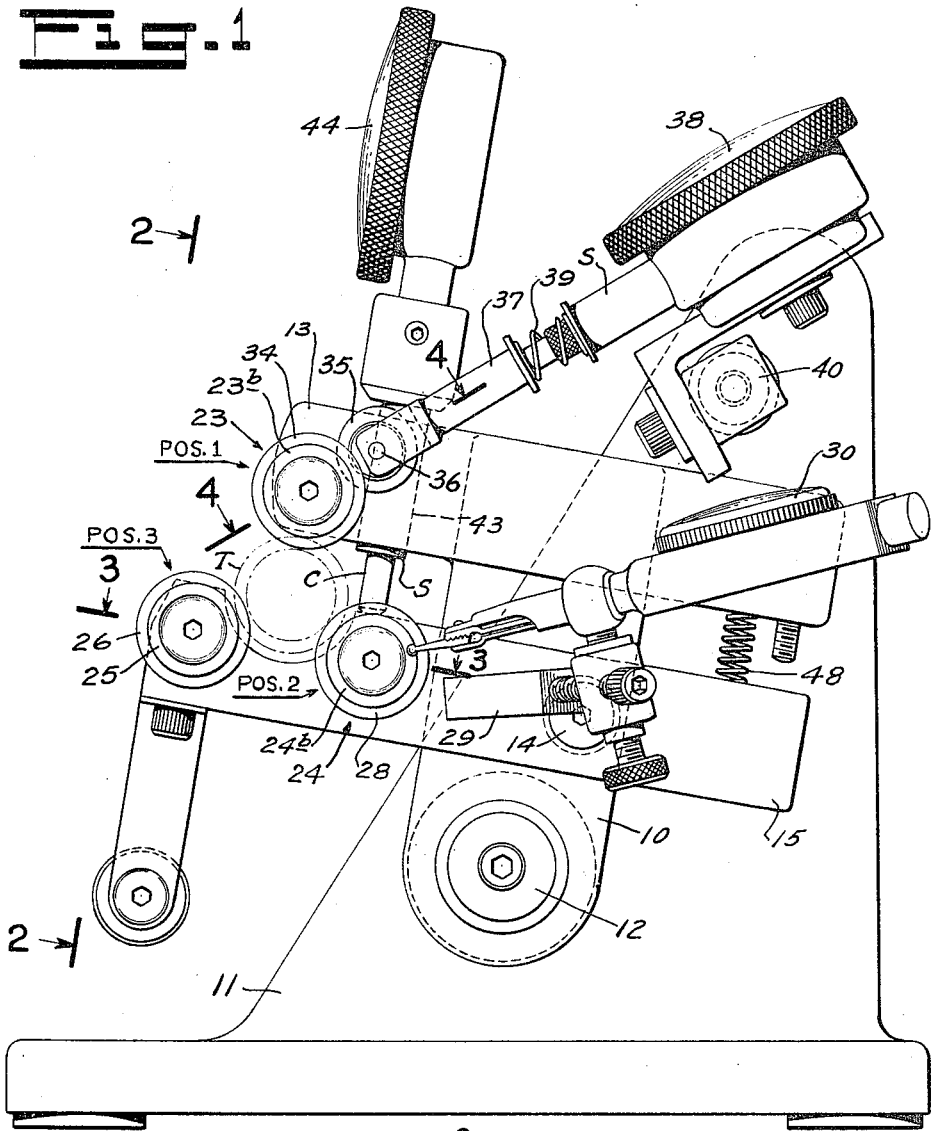
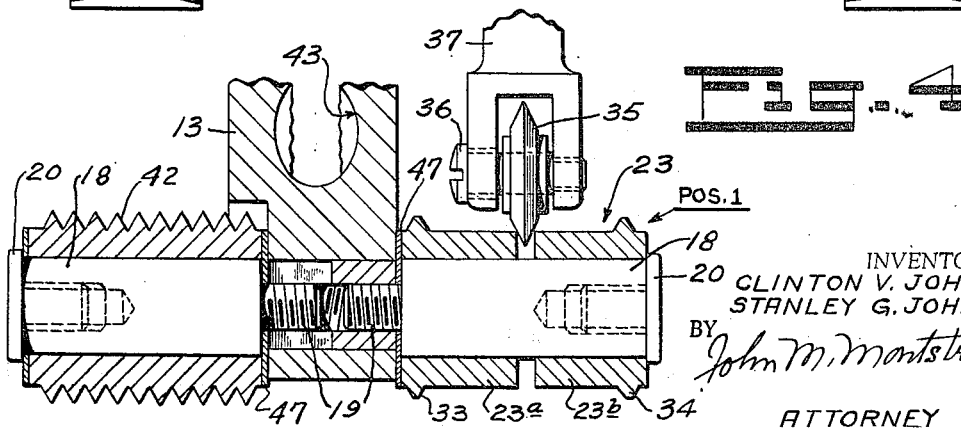
INVENTORS
CLINTON V. JOHNSON
STANLEY G. JOHNSON
BY
John M. Montstream
ATTORNEY

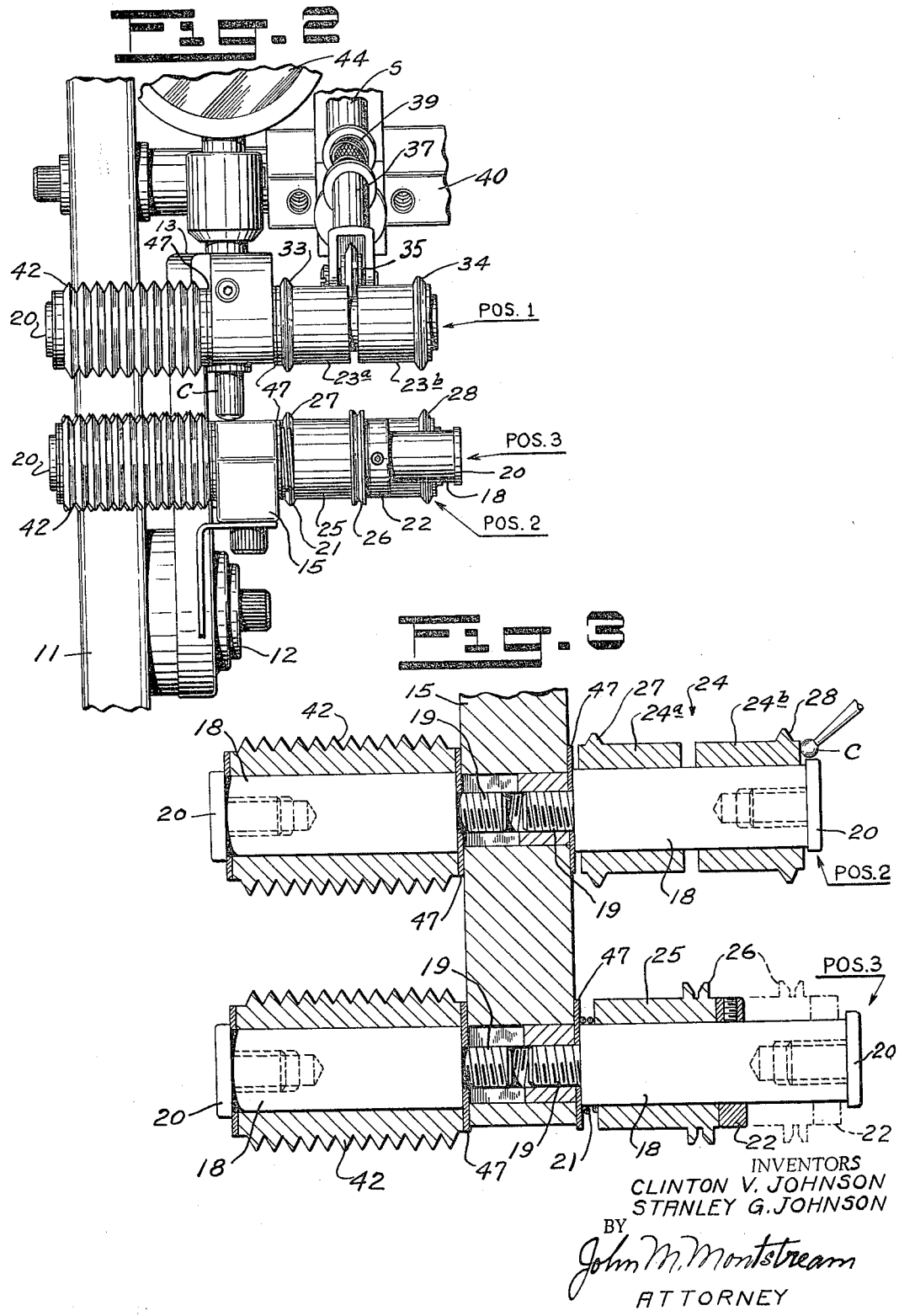

Oct. 11, 1966

C. V. JOHNSON ETAL 3,277,578

SCREW THREAD GAGE FOR TESTING FOR PITCH DIAMETER, LEAD,
DRUNKENNESS, STRAIGHTNESS, ROUNDNESS AND TAPER

Filed Sept. 6, 1963

4 Sheets-Sheet 3

Fig. 6

INVENTORS
CLINTON V. JOHNSON
STANLEY G. JOHNSON
BY
John M. Montstream
ATTORNEY

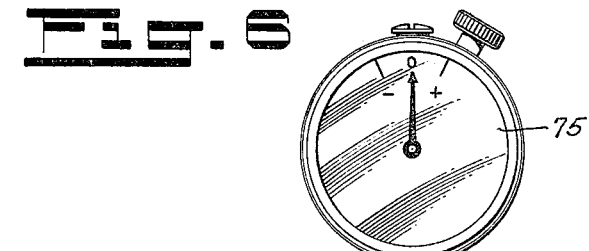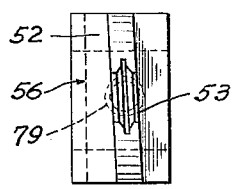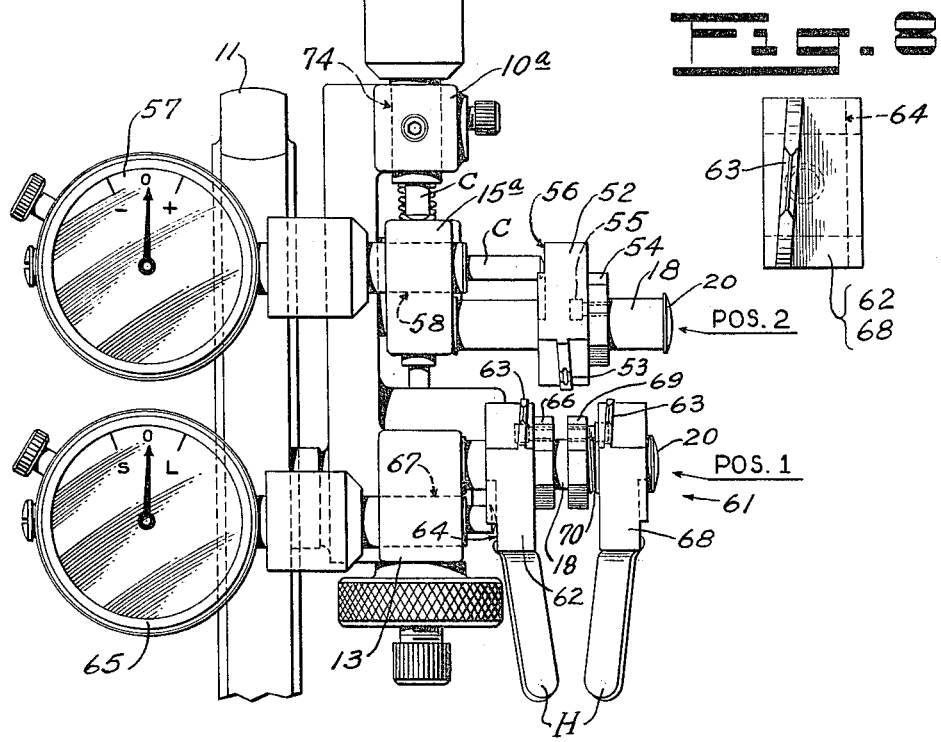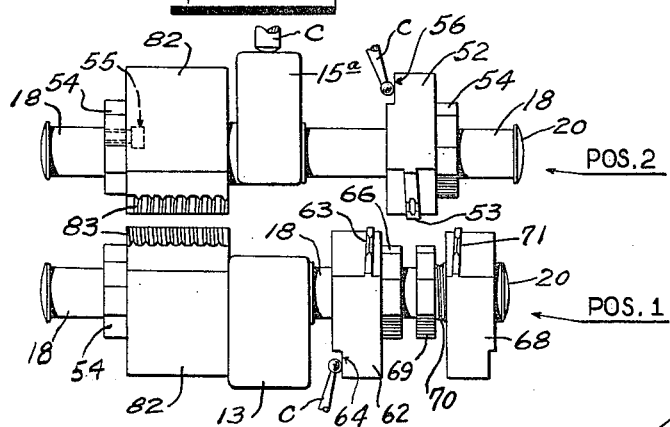

United States Patent Office 3,277,578
Patented Oct. 11, 1966

3,277,578
SCREW THREAD GAGE FOR TESTING FOR PITCH DIAMETER, LEAD, DRUNKENNESS, STRAIGHTNESS, ROUNDNESS AND TAPER
Clinton V. Johnson, Bloomfield, and Stanley G. Johnson, West Hartford, Conn., assignors to The Johnson Gage Company, Bloomfield, Conn., a corporation of Connecticut
Filed Sept. 6, 1963, Ser. No. 307,225
18 Claims. (Cl. 33—199)

The invention relates to a thread gage which in one setting will test a thread for two or more of the thread characteristics of pitch diameter, lead, drunkenness, taper, straightness and roundness. The invention includes a thread gage as above which may also carry gaging elements for determining the assemble-ability of the test thread with a mating internal thread. The broad aspect of the invention comprises a gage having gaging means for gaging the pitch diameter and the lead of a thread, or the pitch diameter and drunkenness of the thread, or the lead and the drunkenness of a thread or all three of these characteristics in one setting of the test part in the gage. A gage so constructed can also gage for roundness and straightness and in the form illustrated can test also for taper.

An object of the invention is to construct a gage for testing screw threads for any two or more thread characteristics of pitch diameter, lead, taper, straightness, drunkenness roundness and assemble-ability.

Another object of the invention is to construct a gage having the above referred to results using three gaging means spaced apart to engage a test thread at three angularly disposed points around the periphery of the test thread.

Another object is to construct a gage having the results referred to above using two gaging means of segmental form engaging opposite sides of the test thread.

A still further object is to construct each of the two gages as above and combines the aforesaid objects or results with gaging elements which will gage a test thread for overall assemble-ability of the thread with a mating internal thread.

Other objects of the invention will be more apparent from the following description when taken in connection with the accompanying drawings which illustrate preferred embodiments thereof in which:

FIG. 1 is a side view of the gage using gaging rolls;
FIG. 2 is a front view of the gage of FIG. 1;
FIG. 3 is an enlarged section taken on the line 3—3 of FIG. 1;
FIG. 4 is an enlarged section taken on line 4—4 of FIG. 1;
FIG. 5 is a side view of a gage with segments;
FIG. 6 is a front view of the gage of FIG. 5;
FIG. 7 is a view of the segment faces;
FIG. 8 is a view of a segment face; and
FIG. 9 shows the gage of FIG. 5 with assemble-ability segments.

The gage includes a frame 10 which for convenience may be mounted on a base 11 of suitable form such as by a bolt 12. Functionally the base constitutes a part of the frame. The frame 10 includes a fixed member shown as an arm 13 and a movable member which is movable towards and away from the fixed member. As particularly shown, the fixed member carries a pivot means 14 and the movable member is a pivot arm 15 pivotally mounted on the pivot means and is shown as being in planar alignment with the fixed arm.

The frame carries a first gaging means 23, and co-operating gaging means. The cooperating gaging means in the form of FIGS. 1–4 are the two gaging means 24 and 25 which preferably are arranged so that two of the gaging means are mounted on the pivoted arm and spaced from the pivot means 14 and a single gaging means is mounted on the fixed arm. Also, the single gaging element is located with respect to the other two gaging means in triangular relation. Preferably the distances between the gaging means are equal or closely equal when in gaging position. The gaging elements in this form of gage are preferably rolls. An arrangement of three gaging means are ordinarily numbered as being in position 1, 2 and 3 shown on the drawings as pos. 1, pos. 2 and pos. 3.

Each of the gaging means is rotatably mounted in position on suitable stud means 18 each of which is attached in its respective position on the frame, such as by a screw 19. Since the stud means are identical except perhaps as to length they bear the same numeral. At least two of the stud means are adjustable so that adjustment may be made between the gaging elements. It is customary to provide adjustable stud means in positions 2 and 3. All three stud means may be of an eccentric type and adjustable whereby one form of stud need be manufactured. The gaging rolls as shown are freely rotatable on the stud means. A headed screw 20 is received on the outer end of each stud means to retain the gaging means thereon and for easy removal and replacement of any gaging means or part thereof. The stud means may be that of the S. G. Johnson Patent 3,222,793, dated December 14, 1965.

The gaging means 25 mounted on the stud means in position 3 is a single gaging element or roll and carries a gaging ridge 26. The gaging means 25 is mounted so that it is axially fixed which may be without lateral or axial movement on its stud means or, as shown, it is pressed against a collar 22 secured to the stud means and pressed there-against by a spring 21. This avoids precise manufacture of the length of the roll.

The gaging means 24 in position 2 is for indicating drunkenness in a test thread T. This gaging means is rotatably mounted on its stud means and includes a pair of gaging elements or rolls 24a and 24b each having a gaging ridge 27 and 28 respectively around its periphery. The gaging elements of this gaging means are mounted on its stud means so that they have lateral or axial freedom of movement thereon. Indicator mounting means 29 is carried by the frame, and preferably by the pivot arm 15 so that the indicator 30 carried thereby moves with the arm and engaging element as they pivot on the pivot means 14 for insertion of a test part. The contact point C of the indicator 30 engages one of the gaging elements, shown as 24b, such as to be responsive to its axial movement and a convenient point for such engagement is the end of the gaging element 24b.

The gaging means 23 in position 1 tests for lead and is mounted for rotation on its stud means and comprises two gaging elements or rolls 23a and 23b. Roll 23a carries a gaging ridge 33 around the periphery thereof and roll 23b carries a gaging ridge 34. Both gaging rolls are mounted for freedom of axial movement on its stud means. Preferably the gaging ridges are far enough apart to engage the thread on the test part several thread turns away from each other. The reason for this is that the lead error in the test thread usually is additive for each thread turn and consequently a more accurate determination of lead error is secured when the relative axial position of the two rolls is controlled by the sum of the lead error for each turn. The spacing shown corresponds with the spacing of the ridges 27 and 28 of the gaging means 24.

Means is provided which is controlled by or responsive to the relative axial position of the two gaging rolls 23a and 23b. As shown, the adjacent ends of these two lead gaging rolls are spaced apart and this space will vary for lead errors so that measuring this space would give the lead error between gaging ridges. If the gaging ridges are one inch apart for a perfect thread, then the lead error per inch is gaged. The space measuring means shown is a wheel 35 which has a V shaped periphery which engages the spaced ends of the gaging elements or rolls and moves radially into and outwardly from this space which changes for lead error in the test thread. An indicator 38 is connected therewith. The connection shown is to mount the V roll 35 on the contactor of the indicator. The angle of the V on the space measuring means is 53 degrees and 8 minutes or twice the angle whose tangent is .500 so that it provides direct reading on the indicator of the axial movement of the two gaging elements. When the space measuring means is a wheel, as shown, it is rotatably mounted on a pin 36 carried by a carrier 37 and movable axially on the pin. This carrier is secured to the contactor of the indicator 38. Since the spring of the indicator pressing the contactor outwardly is relatively weak, additional spring means is provided to augment the outward pressure in a spring 39 which is provided between the end of the carrier and the end of the indicator stem S. This indicator is mounted with respect to the frame by suitable mounting means and conveniently is mounted on a carrying bar 40 secured to the base 11 or base portion of the frame.

One of the arms of the frame has an indicator mounting means carried thereby which may simply be a hole 43 through the arm for receiving the stem of an indicator 44. The contactor C of this indicator engages the other arm 15 and is moved thereby to indicate whether or not the pitch diameter of the test part is within allowable tolerances. As shown the fixed arm carries the mounting means. With a gage having three gaging elements angularly spaced apart to engage the test thread at 120 degrees around the periphery of the test part. In order that the indicator may be direct reading, the indicator is mounted at a point, as is well known, between the axis of the pivot means and the center of the test part to give a direct reading of diameter. This distance is effectively the same distance along the fixed arm between a projection of the center of the pivot means on the fixed arm and the center of the gaging element in position 1.

In gaging a test part, the pivot arm 15 is moved downwardly and the test part is inserted onto the cradle formed by the gaging means in positions 2 and 3 whereupon the arm is released and a spring 48 propels the cooperating gaging means on the pivoted arm upwardly so that the test thread engages the three gaging means. The indicator 44 gives a reading of the average pitch diameter of the test thread and whether or not it is within allowable tolerances. This is an average reading because of the points at which the gaging ridges engages the test part; for example, if the thread is tapered, the reading would be the average of the pitch diameter of the taper thread.

The two gaging rolls or elements 23a and 23b in position 1 adjust themselves axially to engage the thread at their respective locations. If the thread has a faulty lead, the two gaging rolls are moved axially outwardly or inwardly by the test thread T thereby widening or narrowing the space between their adjacent ends so that the space measuring wheel 35 is projected inwardly or outwardly and its position and hence lead is indicated on the indicator by the pointer moving towards one of the tolerance limits. If the lead error is a long lead the space between the ends of the rolls 23a and 23b widens and the pointer on the indicator moves towards one of the tolerance limits carried by the indicator dial in known manner. If the lead error is a short lead, the gaging rolls or elements are moved inwardly by the test thread T which narrows the space therebetween and propels the spacer wheel radially outwardly which will be shown by the pointer of the indicator moving towards the other tolerance limit. If either lead error is too great the pointer of the indicator will move beyond one of the tolerance limits of the indicator. If, on the other hand, the test thread has an acceptable lead, the pointer will come to rest between the tolerance limits of the indicator dial.

The test part is now turned within the gaging means and if the thread of the test part has drunkenness then the gaging element 24b in position 2 will move axially on its stud means to move the indicator contactor of the indicator 30 to reveal that the thread is a drunken thread and the extent of the movement of the pointer of the indicator determines the extent of the drunkenness in the thread. The gaging element 24a serves as a supporting roll for the test thread.

The gage is constructed therefore so that it gives a determination as to three primary and important characteristics of the test thread in one setting. In addition when the test part is rotated, if the pointer of the indicator 44 moves, this movement may be caused by a bow or lack of straightness in the test part or lack of roundness. If the movement occurs once upon one rotation of the test part, a bow is indicated. If the movement occurs more than once for one rotation of the test part, another thread fault or faults is indicated such as out of round, stagger helix or other fault. If both of these conditions exist in the test thread, it will be revealed by the indicator. It is clear that disconnection of any indicator will result in a gage testing the thread for the remaining thread characteristics, such as a reading for pitch diameter and drunkenness or drunkenness and lead or for pitch diameter and lead error. Also the gaging elements in the various positions may be interchanged if desired. It is clear that the most effective gage is one which tests for all thread characteristics.

It has been mentioned hereinbefore that the pitch diameter reading secured by the gage and set-up in the drawings gives the exact pitch diameter if the test thread is not tapered. If the test thread is tapered, then the position of the gaging ridges average the taper and the pitch diameter reading is then an average pitch diameter. The gage, as illustrated therefore, may be provided and is shown as provided with a longer stud means in position 3 so that the collar 22 may be unloosened and moved with the gaging roll 25 to the end of the stud to bring the gaging ridge 26 into approximate alignment with the gaging ridge 28 and 34. The gaging roll 25 is allowed axial freedom so it may adjust itself to the helix. With the gaging roll 25 in its position, the end only of the test part may be inserted into the gaging ridges 26 and 28 whereupon the indicator 44 gives the exact pitch diameter of the thread at the end. By taking another reading at the other or inner end of the thread, the pitch diameter at this point may also be determined. If the two readings are different then this shows that there is a taper in the thread. It is clear that if desired, intermediate readings may also be taken. By rotating the test thread and watching for variations in the reading of the indicator 44 tests the roundness of the test part independently of any bow or lack of straightness. Restoring the gaging roll 25 to its position as illustrated enables the test thread to be gaged for the other characteristics.

In gaging practise it is customary when making a pitch diameter gage that one gaging ridge be a V as shown in the ridge 26 of the gaging element 25 and that the other ridges be cones or vice-versa. When the gage is to measure the pitch diameter with the gaging ridges 26 and 28 located in the approximate planar alignment this is particularly true in order to secure opposite engagement of the thread and a true pitch diameter measurement.

Preferably the gage is constructed so that it will also gage for overall assemble-ability of the test thread with its mating internal thread. This test is secured by providing a pair of stud means 18, in the same stud receiving holes or positions on the opposite side of the movable member or pivot arm 15 and upon each of which stud means there is mounted a gaging element or means 42 having a plurality of spaced gaging ridges around the periphery thereof so that each gaging element contacts a plurality of threads of the test part. The gaging ridges may engage each thread as shown or alternate ridges removed and alternate threads of the test part engaged. Similarly the fixed arm 13, FIGS. 2 and 4, carries stud means on the opposite side thereof in the same stud receiving hole or position for the stud means of the gaging means 23 which stud means also receives a gaging element 42 like the gaging means or elements in positions 2 and 3. These gaging means form a second gaging unit. Usually the stud means in positions 2 and 3 will not be eccentric or non-adjustable and the stud means in position 1 will be eccentric or adjustable so that the position of this gaging means may be adjusted with respect to the cooperating gaging means. Since these gaging elements engage a plurality of threads on the test part, when the test piece is inserted therein, the position of the pivoted arm will be dependent upon the accumulative errors in the test screw thread. The same indicator 44 is used for indicating the accuracy of the thread as to its ability to assemble with its mating internal thread. The thread will engage properly with the mating internal thread if the indicator pointer remains within the tolerance limits allowed which may be set up on the indicator.

The gaging ridges may be of the cone type as illustrated and engaging opposite flanks of the thread groove or they may be of the V type such as ridge 26 which engages opposite flanks of one thread groove. The cross section of the gaging ridge may be of any desired form such as truncated, rounded, circular as a wire, or any other suitable form. It is desirable too to have hardened wear washers 47 at least at the frame end of each stud means. Desirably, however, the cone ridge is used on one side and the V ridge on the other side.

FIGS. 5 through 8 illustrate a gage which gages a test thread for the characteristics discussed in connection with the gage of FIGS. 1–4. This gage, however, uses gaging segments instead of gaging rolls and when segments are used the gage uses two stud means. In this gage the frame 10a is functionally the same as that of FIG. 1 and the base 11 is identical with a bolt 12 for securing the frame 10a to the base. The frame comprises a fixed member having an arm 13 and a pivot means 14 on which is pivotally mounted a pivot arm 15a. The pivot arm 15a constitutes a movable member, movable towards and away from or relatively to the fixed arm or member.

The fixed member carries a stud means 18 and the movable arm carries a like stud means 18. A gaging means, shown as a single gaging element or segment 52, is pivotally mounted on the stud means in position 2 (pos. 2). This segment carries a gaging ridge 53 of arcuate form and it has an angle with respect to the axis of the stud means corresponding with the helix of the thread. A collar or stop means 54 is secured to the stud means by a screw 78 and the collar limits the axial movement of the segment 52 on the stud means to the right as viewed in FIG. 6 but allows axial movement thereof to the left over a range of maximum thread drunkenness. The collar may also carry a stop 55 to limit the pivotal movement of the segments to in-line position between the centers of the two stud means or slightly beyond this center line. In fact the stop 55 as located limits pivotal movement in both directions. The segment 52 has a surface 56 which is engaged by the contactor C of an indicator 57. The movable member or pivoted arm 15a has a hole 58 therethrough which constitutes mounting means for the indicator. The indicator contactor pressing against the surface 56 will indicate any axial movement of this gaging means when the test thread is rotated in gaging position and if the indicator pointer moves, this movement is caused by drunkenness in the thread.

Cooperating gaging means is mounted on the stud means 18 in position 1 on the fixed frame member or arm 13. This cooperating gaging means 61 comprises two gaging elements including a gaging segment 62 pivotally mounted on the stud means 18 which segment carries a gaging ridge 63 of arcuate form. The gaging segment has a surface 64 which is engaged by the contactor C of an indicator 65 suitably mounted on the frame and a convenient mounting means is a hole 67 through the arm 13. A collar 54 limits the axial movement of the segment 62 to the right but it has free axial movement to the left. The range of axial movement is that for both long and short lead error as will be described hereinafter.

The cooperating gaging means includes a second gaging element or segment 68 which is also pivotally mounted on the stud means in position 1 and has a gaging ridge 71 also of arcuate form and angled corresponding to the helix of the test thread. The gaging element or segment 68 is retained in axial fixed position on its stud as a reference position by a collar 69 and a spring 70 which presses the segment against a suitable stop shown as the head of the stud means screw 20. The gaging ridges 63 and 71 are spaced apart a substantial distance or particularly a plurality of thread turns.

The frame carries mounting means for an indicator for testing the thread for pitch diameter. This indicator mounting means may be carried by either the fixed member or the movable member of the frame and in a position such that the contactor engages the other member. In the construction particularly illustrated, the fixed member 10a of the frame has a hole 74 therethrough for receiving the stem of an indicator 75 and this hole constitutes the mounting means therefor. The contactor C of the indicator engages the upper surface of the movable member or pivoted arm 15a of the frame. Since the gaging segments test parts across the diameter thereof, the contractor of indicator 75 is in line with the axis of the studs for segments for direct reading on the indicator.

In using the gage of FIGS. 5 through 8, the gaging elements are in open position as illustrated in FIG. 5. The test thread is inserted laterally into the arcuate ridges by merely pressing the test thread against the segments or the insertion may be assisted by the handles H attached thereto, whereupon the segments pivot to close the same until each segment 62 and 68 engages its respective stop 55. In this position the gaging ridges of the segments are in line between the centers of the stud means or slightly beyond this central line. The segment 52 does not require a stop to limit its movement at gaging positions since the test thread retains it in central position, however, if desired, the segment 52 may engage its stop 55. The gaging segment 68 is essentially fixed as to axial movement and comprises the fixed or reference segment. The gaging segment 62 moves laterally to the left as viewed in FIG. 6 under the action of, or pressure from, the test screw thread. The gaging segment 52 similarly moves laterally to the left under the action of, or pressure from, the test thread.

The test thread moves the gaging element 52 upwardly which moves the movable member 15a upwardly and operates the indicator 75. If the pitch diameter is proper the pointer of the indicator will read on zero and any deviation of the pitch diameter from a perfect or master thread will be shown by the position of the pointer away from zero. Since the gaging elements 52 and 62 move laterally in the event of a lead error or drunkenness, the pitch diameter reading is unaffected by any such error or errors.

The gaging elements 62 and 68 test the thread for lead error. Upon insertion of the test thread into the gaging elements, the axially movable gaging element 62 moves to the left. If the lead is proper the pointer of the indicator 65 comes to rest on zero even though the gaging element 62 has moved axially away from the stop 66 which merely limits the axial movement thereof to the right. If the lead is a short lead, the gaging element 62 will not move as far to the left as for perfect lead which would be shown by the pointer of the indicator coming to rest spaced from the zero mark and on one side (S) thereof. If the lead is a long lead with respect to a perfect lead, the gaging element 62 will move farther to the left than for a perfect lead and the pointer will pass over zero and come to rest therebeyond in the direction (L) or one the other side of the zero from the pointer position for a short lead. In fact the pointer movement may be the reverse of that described depending upon the indicator used. If the lead error is too great the pointer will move beyond the tolerance limit which conveniently may be set into the indicator.

When the test thread was inserted into the gage, the gaging element 52 moved to the left away from the stop 54, however, for a perfect thread, and for the purposes of discussion let it be assumed that, the pointer of indicator 57 points to zero. Now the test thread is turned in gaging position, if the pointer of the indicator 57 does not move, then there is no drunkenness in the thread. If, however the pointer moves back and forth, a drunken thread is indicated and the extent of movement of the pointer is a measure of the amount of drunkenness in the thread.

This rotation or turning of the test thread within the gage may cause the pointer of the indicator 75 to move away from zero position, in which event the test thread is known to have one or more of several conditions. If the pointer moves more than once in each complete rotation of the thread, it is known to have another thread fault or faults such as out-of-round, stagger helix, a nick or some other fault. If, however, the indicator pointer moves once only in a complete rotation of the test thread then it is known that the thread is not straight but is bowed. The combination of these two movements will usually indicate that both thread faults exist.

Since the reading for pitch diameter is taken between two substantially spaced gaging ridges 63 and 71 of the two gaging elements 62 and 68, the pitch diameter reading is what may be termed an average reading. In other words, if the thread is without taper the pitch diameter reading is accurate. If the thread has a taper, then the pitch diameter reading is an average pitch diameter between the two spaced points engaged by the thread. The gage may be set up to indicate exact pitch diameter regardless of taper by unloosening screw 78 of the collar 54 and shifting the gaging element 52, so that its gaging ridge 53 is in line with the gaging ridge 63 of element 68 or approximately in line therewith. A drag screw 79, FIG. 7, its end lightly engaging the stud may be used to put a little frictional drag on the segment so that the gaging element 52 will pivot with the insertion and withdrawal of the test thread from the gage and will remain in released position. There need be no exact axial restriction on the gaging element 52 in this position so long as it is retained approximately in alignment to properly engage the test thread when inserted. With the gaging element 52 so located, the first, second or third thread of the test thread may be inserted into the gage so that the gaging ridges 53 and 63 alone engage the thread. The reading of the indicator 75 is noted. The other end of the test thread is then inserted between the gaging ridges 53 and 63 and if the reading on the indicator 75 is the same it is known that there is no taper in the test thread. In these positions, too, the screw thread may be turned in which event any movement of the pointer of the indicator 75 indicates an out-of-round condition unaffected by any bow or lack of straightness in the thread.

FIG. 9 shows the gage of FIG. 5 with a second gaging unit having a pair of stud means 18 carried on the opposite side of the frame in alignment with or substantial alignment with the stud means of the first gaging unit. A gaging segment 82 is mounted on each of the two stud means. Each segment has an arcuate gaging surface 83 having a plurality of thread ridges thereon for engaging a plurality of threads of the test thread. The test thread is inserted merely by pressing it laterally into the arcuate gaging surfaces. Collars 54 may be used when the studs are long as shown to limit excessive axial movement. Stop means is provided to limit the pivotal movement to center line position or close thereto at gaging position. The stop means 55 is shown as carried by the collar. These segments test the thread for assemble-ability and the indicator 75 indicates any over-all or cumulative deviation of the test thread from a perfect thread. Since the gaging elements of this second gaging unit prevent location of the indicators 57 and 65, as shown in FIG. 6, the type of indicator 30 is used with any convenient mounting means or bracket.

It will be noted that with segments, the same number of tests of a thread is provided with two gaging means and two stud means as with the three gaging means and three stud means of the gage using gaging rolls. In both constructions, however a plurality of gaging means are used as well as a plurality of stud means. In the segmental construction the cooperating gaging means includes one stud means and one gaging means so that in the broader aspect of the two constructions this means includes at least one stud means and at least one gaging means. It is immaterial which gaging means is on which stud means.

It is noted further that in the gage of FIGS. 1–4 it is the gaging means 25 consisting of a single gaging element which constitutes the essentially fixed gaging element whereas in the gage of FIGS. 5–8, it is one of the gaging elements 68 of the two gaging elements of the gaging means 61 which is the fixed gaging element. The gaging means 61 is the lead testing portion of the gage and illustrates that it is not essential that the fixed gaging element be the gaging means which constitutes a single gaging element. To be more specific the construction of the segmental gage teaches that gaging roll 23b may be the fixed gaging element in which event the axial movement of gaging roll 23a is controlled by the lead between ridges 33 and 34. In such event roll 25 will be merely a support roll or it could be used to test for drunkenness rather than roll 24b.

The gage of FIGS. 5–8 further illustrates that the axial movement of one of a pair of spaced gaging elements may be used for the lead test rather than the movement of two gaging elements 23a, 23b as in the gage of FIGS. 1–4. In both constructions the lead is tested between the gaging ridges of the two gaging elements namely ridges 33, 34 of the roll gage and ridges 63 of the segment gage. The reason for this is that the lead error between ridges 33, 34 is the sum of the axial movements of the two gaging elements, or each moves a half distance, whereas the segmental gaging element 62 moves the full axial distance of the lead or lead error from the fixed gaging element 68. It is clear too that the gages herein, may, if desired, gage for any combination of two or more thread characteristics merely by eliminating one of the indicators, however, the most practical gage is one which gages for the three primary thread characteristics of pitch diameter, lead and drunkenness. A gage with these capabilities necessarily can also test for bow and roundness and merely by having a stud means long enough to allow bringing the ridge of one gaging element into alignment with the ridge of another gaging element, as described, the test may also include actual pitch diameter as well as a test for taper. The drunkenness test could also be taken from one of the rolls 23a or 23b.

Both gages may be provided with a second gaging unit as illustrated to also test for over-all assemble-ability of the thread with its mating internal thread. This test could be provided by a second gage having these gaging elements, however, a complete gage has greater practicability and the single indicator 44 and 75 serves for two tests or readings.

The stud means includes the collars mounted thereon, when necessary, in order to secure the desired result. For example, if axial adjustment of the roll 25 was not desired with its function, the stud means could be shortened so that the head of the screw 20 engages the end of the roll.

This is also true of the gaging segment 52 FIG. 9. Collars are not shown on the stud means for the gaging means 24 and 62, 68. It is clear also that the stud means may be longer to accommodate a longer thread if desired in which event collars may be used to adapt such long stud means for a shorter thread.

As is customary in comparator gages the indicators actually indicate the position of a gaging element which is plus or minus from zero reading of a master thread plug or perfect thread which has been used to set the indicator. The comparator indicates the deviation from a perfect screw thread.

This invention is presented to fill a need for improvements in screw thread gage for testing for pitch diameter, drunkenness, lead, straightness, roundness and taper. It is understood that various modifications in structure, as well as changes in mode of operation, assembly, and manner of use, may and often do occur to those skilled in the art, especially after benefiting from the teachings of an invention. This disclosure illustrates the preferred means of embodying the invention in useful form.

What is claimed is:

1. A screw thread gage for a test thread adapted to use indicators each with a contactor comprising a frame including a fixed member having an arm and a movable member mounted on the fixed member for movement towards and away from the arm, at least one gaging unit carried by the frame, each gaging unit including a plurality of stud means carried by the frame on one side thereof and in spaced relation, one stud means being carried by one member and at least one stud means being carried by the other member, a first gaging means mounted on a stud means including a pair of gaging elements each having a gaging ridge and the gaging ridges being spaced a plurality of thread turns from each other, cooperating gaging means mounted on a stud means carried by the other member including a single gaging element having a gaging ridge, the stud means mounting solely one of the aforesaid gaging elements in fixed or essentially fixed axial position, the stud means mounting the other said gaging elements for axial movement, the gaging ridge of the single gaging element being located midway between the gaging ridges of the first gaging means, and a plurality of indicator mounting means carried by the frame each adapted to mount an indicator with the contactor thereof to be connected to indicate at least two of the movements or positions including that of the movable member with respect to the fixed member and the axial movement of one of the axially movable gaging elements of one gaging means and the axial movement of at least one axially movable gaging element of another gaging means.

2. A screw thread gage for a test thread adapted to use indicators each with a contactor comprising a frame including a fixed member having an arm and a movable member mounted on the fixed member for movement towards and away from the arm, at least one gaging unit carried by the frame, each gaging unit including a plurality of stud means carried by the frame in spaced relation one being carried by one member and at least one being carried by the other member, a first gaging means mounted on a stud means carried by one member including a pair of gaging elements each having a gaging ridge and the gaging ridges being spaced a plurality of thread turns from each other, cooperating gaging means mounted on stud means carried by the other member including a single gaging element having a gaging ridge, the stud means mounting solely one of the aforesaid gaging elements in fixed or essentially fixed axial gaging position, the stud means mounting the other said gaging elements for axial movement, the gaging ridge of the single gaging element being located midway between the gaging ridges of the first gaging means, a plurality of indicator mounting means carried by the frame including a first mounting means carried by one of the members to mount an indicator thereon in a position for the indicator contactor to engage the other member to gage pitch diameter, and at least one other indicator mounting means carried by the frame adapted to mount an indicator to be connected with and responsive to axial movement of at least one axially movable gaging element.

3. A screw thread gage as in claim 2 including another indicator mounting means carried by the frame and located to receive an indicator the contactor of which is to be connected with and responsive to a second axially movable gaging element.

4. A screw thread gage as in claim 2 including a second gaging unit having stud means carried by the frame on the opposite side thereof for each of the aforesaid stud means and in substantial axial alignment with the aforesaid stud means, and gaging means mounted on each stud means and each gaging means having a plurality of gaging ridges.

5. A screw thread gage as in claim 2 in which the stud means for the gaging means having a single gaging element is substantially longer than the element, and gaging element adjusting means carried by the stud means for the single gaging element to position the gaging element at midway position and permitting said single element to be shifted to a position with its gaging ridge in alignment with the gaging ridge of a gaging element of another gaging means.

6. A screw thread gage for a test thread adapted to use indicators each with a contactor comprising a frame including a fixed member having an arm and a movable member mounted on the fixed member for movement towards and away from the arm, at least one gaging unit carried by the frame, each gaging unit including three stud means carried by the frame on one side thereof and in spaced relation with their axes in triangular relation, one stud means being carried by one member and two stud means being carried by the other member; gaging means mounted on each stud means comprising a first gaging means including a pair of gaging rolls each having a gaging ridge and the two gaging ridges being spaced a plurality of thread turns from each other, a second gaging means including a pair of gaging rolls each having a gaging ridge around its periphery and the ridges being in alignment with the gaging ridges of the rolls of the first gaging means, and a third gaging means consisting of a single gaging roll having a gaging ridge; the stud means mounting solely one of the aforesaid gaging rolls in fixed or essentially fixed axial position, the stud means mounting the other said gaging rolls for axial movement, the gaging ridge of the single gaging roll being located midway between the gaging ridges of the other gaging means, and a plurality of indicator mounting means carried by the frame each adapted to mount an indicator with the contactor thereof to be connected to indicate at least two of the movements or positions including the position of the movable member with respect to the fixed member and the axial position of one of the axially movable gaging rolls of one gaging means, and the axial position of at least one axially movable gaging roll of another gaging means.

7. A screw thread gage as in claim 6 in which the plurality of indicator mounting means includes a third indicator mounting means for a third indicator the contactor of which is to be connected to indicate a third position of the gaging means.

8. A screw thread gage as in claim 6 in which the gaging roll of the third gaging means is fixed, and including connecting means engaging the two gaging rolls of the first gaging means and responsive to the axial movement of both gaging rolls, and the indicator mounting means being positioned so that its indicator will be responsive to the connecting means.

9. A screw thread gage as in claim 8 in which the adjacent ends of the gaging rolls of the first gaging means are spaced from each other, and the connecting means engages the adjacent ends of the gaging rolls and moves radially with respect thereto.

10. A screw thread gage as in claim 6 in which one indicator mounting means is located to indicate the position of the members and a second indicator mounting means is located to support an indicator to engage solely one of the gaging rolls of the second gaging means and responsive to its axial movement.

11. A screw thread gage as in claim 8 in which the indicator mounting means includes a third indicator mounting means carried by the frame and located to support an indicator with its contactor to engage solely one of the gaging elements of the second gaging means and responsive to its axial movement.

12. A screw thread gage as in claim 6 in which the stud means for the single gaging roll is long, and gaging roll adjustment means positioning the single gaging roll on its stud means and for adjustment of its position to locate its gaging ridge in alignment with the gaging ridge of a gaging roll of another of said gaging means.

13. A screw thread gage as in claim 6 in which solely one stud means is carried by the fixed frame member, the first gaging means being mounted on the aforesaid stud means, the gaging rolls of the first gaging means being movable axially and having their adjacent ends spaced from each other, connecting means having a V shaped end engaging between the ends of the gaging rolls, an indicator having a contactor mounted in an indicator mounting means with the connecting means carried by the contactor, the gaging rolls of the second gaging means being movable axially, the gaging roll of the third gaging means being the fixed or essentially fixed axial roll and the indicator mounting means comprising three mounting means.

14. A screw thread gage for a test thread comprising a frame including a fixed member and a movable member mounted for movement towards and away from the fixed member, at least one gaging unit carried by the frame, said gaging unit including two stud means one being carried by one member and one being carried by the other member, a first gaging means mounted on a stud means including a pair of gaging segments each having an arcuate gaging ridge with the gaging ridges being spaced a plurality of thread turns from each other, cooperating gaging means consisting of a single gaging segment mounted on the stud means on the other member and having an arcuate gaging ridge, the stud means mounting one gaging segment in fixed or essentially fixed axial gaging position and mounting the other gaging segments for axial movement, the gaging ridge of the single gaging element being located midway between the gaging ridges of the first gaging means, stop means limiting the pivotal movement of the gaging segments to gaging position, and a plurality of indicator mounting means carried by the frame each adapted to mount an indicator with the contactor thereof to be connected to indicate at least two of the movements or positions including that of the movable member with respect to the fixed member and the axial position of the axially movable gaging segment of one gaging means and the axial position of the gaging segment of another gaging means.

15. A screw thread gage as in claim 14 in which one of the indicator mounting means is located on one frame member such that its indicator contactor will engage the other frame member.

16. A screw thread gage as in claim 15 including a third indicator mounting means carried by the frame to mount an indicator for its contactor to indicate a third position.

17. A screw thread gage as in claim 16 in which one of the gaging segments of the first gaging means is fixed.

18. A screw thread gage as in claim 16 including a second gaging unit comprising stud means carried by the frame in axial alignment or approximate axial alignment with the stud means for the other gaging unit, and gaging means carried on each stud means each gaging means including a gaging segment with a long arcuate gaging surface having a plurality of gaging ridges.

References Cited by the Examiner

UNITED STATES PATENTS

| | | | |
|---|---|---|---|
| 1,939,643 | 12/1933 | Beardsley | 33—199 |
| 2,027,217 | 1/1936 | Zerkle | 33—199 |
| 2,308,011 | 1/1943 | Johnson | 33—199 |
| 2,586,053 | 2/1952 | Johnson | 33—199 |
| 2,611,970 | 9/1952 | Johnson | 33—199 X |
| 2,706,859 | 4/1955 | Johnson | 33—199 X |
| 2,770,050 | 11/1956 | Johnson | 33—199 X |
| 2,842,862 | 7/1958 | Johnson | 33—199 |

LEONARD FORMAN, *Primary Examiner.*

ISAAC LISANN, *Examiner.*

J. BOOS, *Assistant Examiner.*